Patented Jan. 28, 1947

2,414,936

UNITED STATES PATENT OFFICE 2,414,936

FOLLOW-UP CONTROL SYSTEM

Martin A. Edwards, Scotia, and Hugh M. Ogle, Schenectady, N. Y., assignors to General Electric Company, a corporation of New York Application May 25, 1944, Serial No. 537,342

9 Claims. (Cl. 172—239)

1

This invention relates to control systems, more particularly to follow-up control systems, and it has for an object the provision of a simple, reliable, inexpensive, and improved control system of this character.

On aircraft, the positioning of many devices must be controlled from a remote location, and a further object of this invention is the provision of a light, small, and compact follow-up control system which is suitable for use on aircraft.

In carrying the invention into effect in one form thereof, an electric motor is controlled to drive an object into positional agreement with a remote pilot device. The motor is controlled by means of a pair of saturable core reactors. Each of these reactors has a reactance winding and a D.-C. saturation control winding. The reactance windings are supplied from a suitable source of alternating voltage, and a rectifier is included in circuit with each reactance winding to provide an initial fixed polarity saturation of the reactor. Means responsive to positional disagreement of the pilot device and driven object control the supply of a direct current to the saturation control windings to increase the saturation of one of the reactors, depending upon the sine of the disagreement, and to decrease the saturation of the other of the reactors. The difference in saturation of the reactors is utilized to energize the energization of the motor. The increase in saturation of one of the reactors and decrease in the saturation of the other cause the motor to rotate in one direction, and the reverse condition causes the motor to rotate in the opposite direction.

Figure 1:
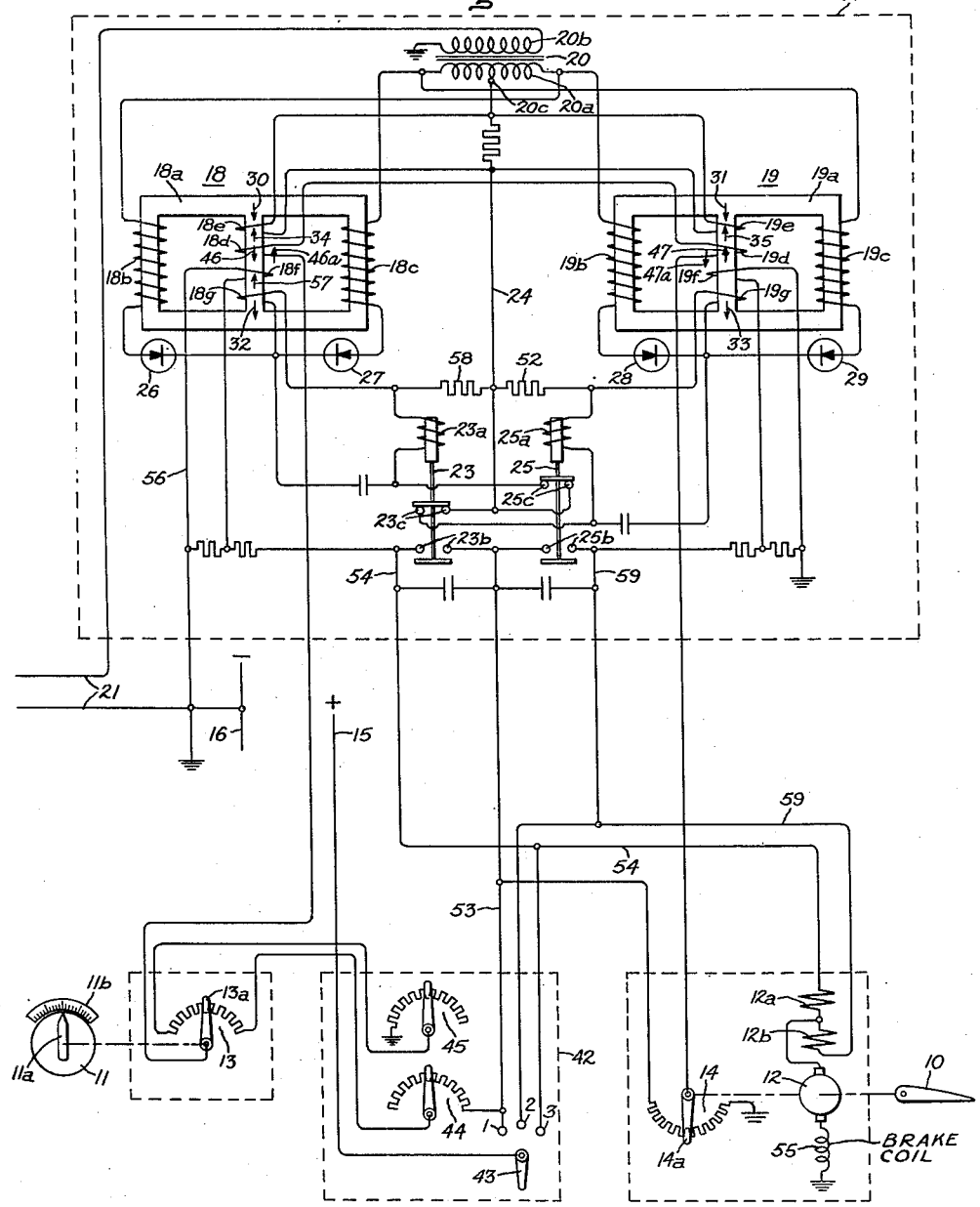
Figure 2:
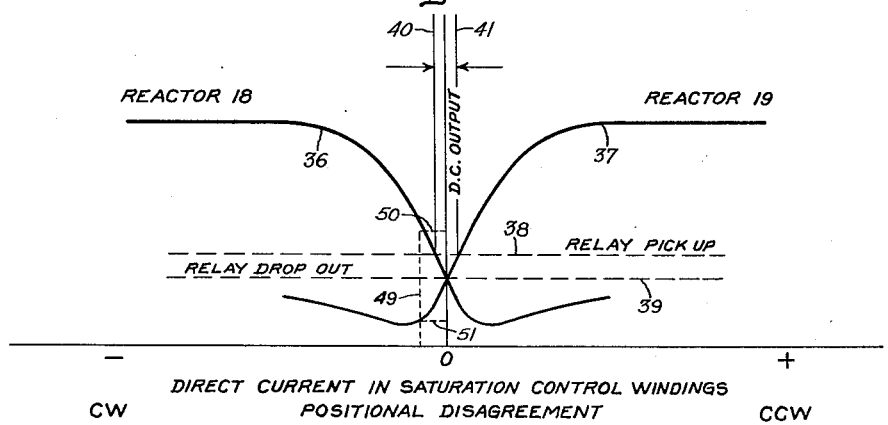
Figure 3:
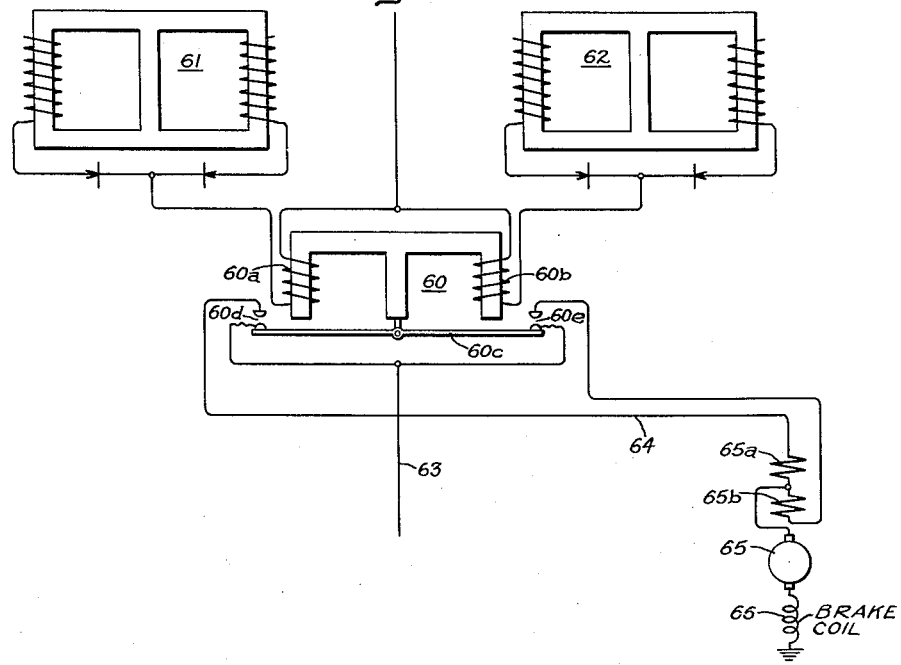

For a better and more complete understanding of the invention, reference should now be had to the following specification and to the accompanying drawings of which Fig. 1 is a simple, diagrammatical sketch of an embodiment of the invention; Fig. 2 is a chart of characteristic curves which serve to facilitate an understanding of the invention; and Fig. 3 is a modification.

Referring now to the drawings, an object 10 is to be moved into positions which correspond to the positions of a pilot device 11. The pilot device 11 may be a manually operated knob provided with an indicating member 11a which co-operates with a calibrated scale 11b. It is mounted in a position which is convenient to the pilot.

The object 10 is driven by any suitable means such as the electric motor 12 to the shaft of which it is connected by suitable coupling means (not shown). Although the motor 12 may be of any suitable type, it is illustrated as a D.-C. series field

2 type motor provided with split series field windings 12a and 12b. The two series field windings 12a and 12b are oppositely poled so that when the armature is energized through one of the fields, the rotation is in one direction, and when the armature is energized through the other field winding, the rotation is in the opposite direction.

For the purpose of providing a signal control voltage in response to positional disagreement of the pilot device 11 and object 10, a master potentiometer 13 and a follow-up potentiometer 14 are provided. These two potentiometers are connected in a bridge circuit which is supplied from a suitable source of direct voltage which is represented by the two supply lines 15 and 16. The slider 13a of the master potentiometer is mechanically coupled to the pilot knob 11, and the slider 14a of the follow-up potentiometer is mechanically coupled to the shaft of the follow-up motor 12. When the driven object 10 is in positional agreement with the pilot knob 11, the sliders 13a and 14a occupy equipotential positions on the resistance elements of the master and follow-up potentiometers. When the object 10 and pilot knob 11 are not in positional agreement, the sliders 13a and 14a do not occupy equipotential positions on the potentiometer resistors, and consequently, a voltage exists across these sliders. This voltage is the signal voltage which is utilized to control the energization of the drive motor.

For the purpose of amplifying this voltage, a magnetic type amplifier 17 is provided. This amplifier comprises a pair of saturable core reactors 18 and 19. As shown, the reactor 18 has a three-legged closed core member 18a. On the outer legs of the core structure are mounted reactance windings 18b and 18c, and on the middle leg are mounted a D.-C. saturation control winding 18d, a bias or compensating control winding 18e, an antihunt or jogging winding 18f, and a feedback winding 18g.

The saturable core reactor 19 is identical with the reactor 18 and has corresponding reactance windings 19b and 19c, saturation control winding 19d, bias compensating winding 19e, antihunt winding 19f, and feedback winding 19g.

Alternating voltage is supplied to the terminals of the reactance windings 18b, 18c, 19b, and 19c from the secondary winding 20a of a supply transformer 20, of which the primary winding 20b is supplied from a suitable source of alternating voltage such as the A.-C. supply buses 21. As shown, the upper terminals of the reactance windings 18b and 18c of reactor 18 are connected to opposite terminals of the secondary winding 20a, and the lower terminals are connected together and through the feedback winding 18g and the operating coil 23a of a relay 23, conductor 24, and bias compensating windings 18e and 19e in parallel to the center tap 20c of the secondary winding of the transformer. The reactance windings 19b and 19c of reactor 19 are similarly connected from opposite terminals of the secondary winding 20a through operating coil 25a of a relay 25, conductor 24, and the bias compensating windings 18e and 19e in parallel to the center tap 20c of the transformer secondary winding 20a.

For the purpose of rectifying the current flowing in the reactance windings, half-wave rectifiers 26, 27, 28, and 29 are connected in circuit with reactance windings 18b, 18c, 19b, and 19c, respectively. Although these rectifiers may be of any suitable type, they are preferably of the surface contact type such as the well-known selenium rectifier. Since the reactance windings 18b and 18c are connected to opposite terminals of the secondary winding of the transformer, current flows in these windings and also in the reactance windings 19b and 19c during alternate half-cycles of the wave of the A.-C. voltage supplied to the transformer. Thus, there flows in each of the reactance windings a pulsating, periodically interrupted, direct current which may be resolved into an A.-C. component and a D.-C. component. The reactance windings of each reactor and the rectifiers are so poled that the magnetizations produced by the D.-C. components are in the same direction in the middle legs of the reactors—for example, downward—as indicated by the arrows 30 and 31. As a result of this D.-C. magnetization, there is produced in the cores 18a and 19a an initial fixed polarity partial saturation. The feedback windings 18g and 19g produce a regenerative feedback; i. e., they are so poled that the magnetizations which they produce add to the initial saturation as indicated by the arrows 32 and 33.

The saturation control windings 18d and 19d of the two reactors are connected in series relationship between the sliders 13a and 14a of the master and follow-up potentiometers. When a voltage exists between the sliders 13a and 14a as a result of positional disagreement of the pilot device 11 and driven object 10, a current is caused to flow in the saturation control windings 18d and 19d which are so poled that the magnetization produced by one of these windings adds to the initial saturation of its reactor, and the magnetization produced by the other winding subtracts from the initial saturation of the other reactor. For a disagreement of opposite sign the magnetizations of the first reactor become subtractive and those of the second reactor become additive.

The compensating windings 18e and 19e are so poled that the magnetizations which they produce oppose the initial saturation as indicated by arrows 34 and 35, respectively.

The reactance of the windings 18b, 18c, 19b, and 19c is determined by the degree of saturation of the cores. When the saturation is maximum, the reactance is a minimum, and when the saturation is minimum, the reactance is maximum. Consequently, the current flowing in the reactance windings and in the output circuits is a maximum when the saturation is maximum, and is a minimum when the saturation is a minimum. For intermediate values of saturation, the output current has corresponding intermediate values.

The relationship between the direct current flowing in the saturation control windings and the output current is nonlinear as illustrated in Fig. 2 in which abscissae represent the current flowing in the saturation control windings and ordinates represent the current flowing in the reactance windings and through the rectifiers into the output circuit. Since the current flowing in the saturation control windings is proportional to positional disagreement of the pilot device and driven object, the abscissae also represent positional disagreement. The curve 36 illustrates the relationship between output current and input current or positional disagreement for the reactor 18, and the curve 37 represents the same relationship for the reactor 19.

Owing to the opposing polarity of the windings 18e and 19e, variations in the frequency or magnitude of the voltage of the A.-C. source 21 are partially compensated.

As indicated in Fig. 2, the relays 23 and 25 are adjusted to pick up at a value of output current corresponding to the ordinate of horizontal line 38 and to drop out at an output current corresponding to the ordinate of horizontal line 39. The difference between relay pickup and dropout values provides a dead zone of positional disagreement between the pilot device and driven object within which neither relay will pick up. This dead zone is represented by the distance between the two vertical lines 40 and 41.

A suitable controlling accessory 42 is also provided. This accessory has a selector switch 43 which has three operating positions. In the first position, the switch provides for automatic operation of the system in response to positional disagreement of the pilot device and driven object. In the second or third positions, it provides for direct manual control of the follow-up motor for rotation in either direction. Trimmer rheostats 44 and 45 are also provided between the terminals of the master potentiometer and both sides of the D.-C. 15, 16.

With the foregoing understanding of the elements and their organization, the operation will readily be understood from the following detailed description. It is assumed that the driven object 10 is in positional agreement with the indicating member 11a of the pilot device 11. Under this condition, the sliders 13a and 14a of the master and follow-up potentiometers occupy equipotential positions on the resistance members of the potentiometers and no voltage is applied to the saturation control windings 18d and 19d. Consequently, both relays 23 and 25 are dropped out. If automatic operation of the system is desired, the selector switch 43 is moved to position 1.

Movement of the pilot knob 11 to a predetermined position with respect to the calibrated dial 11b produces a corresponding displacement of the slider 13a from the position in which it is illustrated in the drawings. As a result, a voltage exists across the two sliders 13a and 14a and a D.-C. current is caused to flow through the saturation control windings 18d and 19d. The current flowing in the saturation control winding 18d is in such a direction that the magnetization produced by this winding adds to the initial fixed polarity saturation of the reactor 18 as indicated by the arrow 46. On the other hand, the current flowing in the saturation control winding 19d of the reactor 19 is in such a direction that the magnetization which the winding 19d produces opposes the initial fixed polarity saturation as indicated by the arrow 47. As a result, the output current of the reactor 18 which flows through the operating coil 23a of relay 23 increases to a value which corresponds to the amount of the positional disagreement of the pilot device and driven object. For example, assuming a positional disagreement which is outside the dead zone such as the disagreement represented by the abscissa of vertical line 49, the output current of reactor 18 will increase to a value such as represented by the ordinate of the horizontal line 50. Consequently, the energization of the relay 23 which is in excess of the pickup value will cause the relay to pick up. On the other hand, the energization of the relay 25 is decreased below the dropout value and therefore the relay 25 remains dropped out.

In picking up, relay 23 closes its normally open contacts 23b and opens its normally closed contacts 23c. Contacts 23c in opening interrupt the circuit for the operating coil 25a of relay 25. However, the output current of the reactor 19 continues to flow through the resistor 52 and the two bias compensating windings 18e and 19e in parallel, thereby preventing any substantial decrease of the current flowing in the bias compensating windings 18e and 19e as a result of the opening of contacts 23c.

Contacts 23b in closing complete an energizing circuit for the follow-up motor 12 which is traced from the positive side 15 of the D.-C. source through the contacts of the selector switch 43 in the first position, through the conductor 53, contacts 23b, conductor 54, series field winding 12a and armature of the motor 12, brake coil 55 to ground and thus to the opposite side of the source. As a result of energization, the brake coil releases the brake (not shown) and the motor 12 rotates in a direction to drive the driven object 10 in a direction which corresponds to the displacement of the pilot device 11 and to move the slider 14a toward a position on the resistance element having the same potential as the slider 13a of the master potentiometer.

Contact 23b in closing also completes a circuit for the energization of the antihunt winding 18f. This circuit is traced from the positive side of the source to the contacts 23b as before and thence through the antihunt winding 18f and the conductor 56 to the opposite side of the source.

The antihunt winding 18f is so poled that the magnetization which it produces opposes the magnetization produced by the saturation control winding 18d as indicated by the arrow 57. This has an effect on the characteristics of the reactor 18 which may be visualized by shifting the characteristic curve 36 toward the left. Thus the ultimate effect is that the dead zone is widened. Consequently, as the follow-up motor 12 drives the object 10 toward a position of correspondence with the pilot device 11 and also moves the slider 14a toward a position of balance with respect to the slider 13a, the relay 23 drops out when the relay dropout value is reached on the shifted characteristic curve. This occurs considerably before the current in the saturation control winding is reduced to zero. When the relay drops out, the contact 23b interrupts the motor circuit and at the same time interrupts the circuit of the antihunt winding 18f. Consequently, the reactor 18 is no longer biased by the antihunt winding and the characteristic curve 36 is shifted back to its original position in which it is illustrated in Fig. 2. Thus, the dead zone is again narrowed to its original value and the output current of the reactor 18 is in excess of the relay pickup value. As a result, the relay again picks up and continues to drop out and pick up or to flutter at a speed determined by the time constants of the circuit. The motor is therefore jogged until the bridge is balanced within the limits of the small dead zone.

If the pilot knob 11 is rotated in a counterclockwise direction from the position in which it is illustrated, the polarity of the voltage across the sliders 13a and 14a is opposite to that described in the foregoing operation and current flows through the saturation control windings 18d and 19d in the reverse direction. Thus, the magnetization produced by the winding 19d adds to the initial saturation of reactor 19 as indicated by the arrow 47a, and the magnetization produced by the winding 18d subtracts from the initial saturation of reactor 18 as indicated by the arrow 46a, and causes the current flowing in the relay coil 25a to increase and that in the relay coil 23a to decrease. When the current in the relay coil 25a equals the pickup value, the relay 25 picks up to open its normally closed contacts 25c and to close its normally open contacts 25b. Contacts 25c in opening interrupt the circuit for the operating coil 23a of relay 23. However, current continues to flow through the reactance windings 18b and 18c, the rectifiers 26 and 27, the feedback winding 18g and resistor 58 to the bias compensation windings 18e and 19e in parallel, thereby preventing any substantial decrease in the current in the compensating windings as a result of the opening of the contacts 25c.

The contacts 25b in closing complete a circuit from the source to the follow-up motor 12 through the split series field winding 12b. This circuit is traced from the conductor 53 which is connected to the positive side of the supply source through contacts 25b, conductor 59, split series field winding 12b and armature of motor 12 to ground and to the opposite side of the supply source. The remainder of the operation is the same as that described in the foregoing except that the follow-up motor 12 rotates in the opposite direction.

The modification of Fig. 3 differs from the modification of Fig. 1 primarily in that the relays 23 and 25 of Fig. 1 are replaced by a single differential type relay 60. Since the modification of Fig. 3 is similar to that of Fig. 1, only those parts are shown in Fig. 3 which serve to illustrate the features of Fig. 3 which are not present in Fig. 1. As shown, this relay has an E-shape core structure. Upon the outer legs of the core structure are mounted two coils 60a and 60b. These coils are connected in the same manner as are the two separate relay coils 23a and 25a of Fig. 1; i. e., they are connected in the output circuits of the two saturable core reactors 61 and 62 which correspond to the reactors 18 and 19 of the Fig. 1 modification. This relay has a single armature member 60c which is pivoted at the center to provide for limited rotation in either direction, depending upon which of the two coils 60a or 60b carries the greater exciting current. At the opposite extremities of the armature, contacts 60d and 60e are provided.

When the saturation of reactor 61 is increased and the saturation of reactor 62 is decreased in response to movement of the pilot knob (not shown) in one direction, the energizing current of coil 60a is increased and that of the coil 60b is correspondingly decreased. Consequently, the left end of the armature 60c is attracted toward the core and the armature rotates counterclockwise about its pivot to close contacts 60d. In closing, contacts 60d complete a circuit for the follow-up motor from the conductor 63 which is connected to one side of the source and which corresponds to the conductor 53 of Fig. 1, through conductor 64, split series field winding 65a and armature of series motor 65, brake winding 66 to ground and to the opposite side of the source. As a result, the brake is released and the motor 65 is energized for rotation in a direction corresponding to that in which the pilot knob was moved. The operation is the same as that described for the Fig. 1 modification.

If the saturation of the reactor 62 is increased and the saturation of the reactor 61 decreased in response to movement of the pilot knob in the opposite direction, the energization of the coil 60b of the relay 60 will predominate over that of the coil 60a and, consequently, the armature 60c will be rotated in a clockwise direction to close its contacts 60e. In closing, contacts 60e complete a circuit for the motor 65 from the conductor 63 which is connected to one side of the source through the reverse split series field winding 65b and the armature of motor 65 to ground and the opposite side of the source. As a result, the motor 65 rotates in the reverse direction until the condition of balance is established.

In this modification, the bias compensating windings may be omitted from the reactors 61 and 62, since the differential relay 60 is self-compensating for variations in the frequency and magnitude of the voltage of the supply source.

Although in accordance with the provisions of the patent statutes this invention is described as embodied in concrete form and the principle thereof has been explained, together with the best mode in which it is now contemplated applying that principle, it will be understood that the apparatus shown and described is merely illustrative and that the invention is not limited thereto, since alterations and modifications will readily suggest themselves to persons skilled in the art without departing from the true spirit of this invention or from the scope of the annexed claims.

What we claim as new and desire to secure by Letters Patent of the United States is:

1. A system for controlling the driving of an object into positional agreement with a pilot device comprising in combination, a source of alternating voltage, a pair of saturable core reactors each having a reactance winding supplied from said source and a D.-C. saturation control winding, means connected in circuit with said reactance windings for rectifying the current in said windings, thereby to provide an initial fixed polarity saturation of said reactors, means responsive to positional disagreement of said pilot device and driven object for supplying a direct current to said control windings for selectively increasing the saturation of one of said reactors depending upon the sign of said disagreement and correspondingly decreasing the saturation of the other of said reactors, a feedback winding on each of said reactors supplied with said rectified current for amplifying the difference in saturation produced by said control windings, and an electric motor energized in response to the difference in saturation of said reactors for driving said object toward a position of correspondence with said pilot device.

2. A system for controlling the driving of an object into positional agreement with a pilot device comprising in combination a source of alternating voltage, a pair of saturable core reactors each having a reactance winding supplied from said source and a D.-C. saturating control winding, means connected in circuit with said reactance windings for rectifying the current therein thereby to provide an initial fixed polarity saturation of said reactors, means responsive to positional disagreement of said pilot device and driven object for supplying a current to the control windings of said reactors to increase the saturation of one of said reactors depending on the sign of said disagreement and to decrease the saturation of the other of said reactors, an electric motor energized in response to the difference in saturation of said reactors for driving said object toward positional agreement with said pilot device, and an additional winding on each of said reactors excited by said rectified current and poled to oppose the magnetization produced by said rectified currents in said reactance windings to compensate for variations in the voltage of said source.

3. A follow up control system for controlling the driving of an object into positional agreement with a pilot device comprising in combination an electric motor for driving said object, a source of alternating voltage, a pair of saturable core reactors each having a reactance winding supplied from said source, an anti-hunt winding, and a D.-C. saturation control winding, means in circuit with each of said reactance windings for rectifying the current in said reactance windings to provide an initial fixed polarity saturation of said reactors, means responsive to positional disagreement of pilot device and driven object for supplying direct current to said control windings to increase the saturation of a first one of said reactors and decrease the saturation of the second of said reactors, and means responsive to the difference in saturation of said reactors for energizing said motor for rotation in a diection to drive said object toward positional agreement with said pilot device and supplying a direct current to the anti-hunt winding of said first reactor of a polarity to cause the magnetization of said anti-hunt winding to oppose the magnetization produced by its control winding.

4. A system for controlling the driving of an object into positional agreement with a pilot device comprising in combination, a source of alternating voltage, a pair of saturable core reactors each having a reactance winding supplied from said source and a D.-C. saturation control winding, means connected in circuit with said reactance windings for rectifying the current in said windings thereby to provide an initial fixed polarity saturation of said reactors, means responsive to positional disagreement of said pilot device and driven object for supplying a direct current to said control windings for selectively increasing the saturation of one of said reactors depending upon the sign of said disagreement and correspondingly decreasing the saturation of the other of said reactors, a feedback winding on each of said reactors supplied with said rectified current for amplifying the difference in saturation produced by said control windings, an additional winding on each of said reactors excited by said rectified current and poled to oppose the magnetization produced by said rectified currents in said reactance windings to compensate for variations in said line voltage.

5. A system for controlling the driving of an object into positional agreement with a pilot device comprising in combination a source of alternating voltage, a pair of saturable core reactors each having a reactance winding supplied from said source and a D.-C. saturation control winding, means connected in circuit with said reactance windings for rectifying the current in said windings, thereby to provide an initial fixed polarity saturation of said reactors, means responsive to positional disagreement of said pilot device and driven object for suplying a direct current to said control windings for selectively increasing the saturation of one of said reactors depending upon the sign of said disagreement and correspondingly decreasing the saturation of the other of said reactors, a feedback winding on each of said reactors supplied with said rectified current and poled to aid said initial saturation for amplifying the difference in saturation produced by said control windings, anti-hunt means comprising an additional winding in each of said reactors, and means responsive to the difference in saturation of said reactors for energizing said motor for rotation in a direction to drive said object toward positional agreement with said pilot device and supplying a direct current to the anti-hunt winding of said first reactor of a polarity to cause the magnetization of said anti-hunt winding to oppose the magnetization produced by its control winding.

6. A system for controlling the driving of an object into positional agreement with a pilot device comprising in combination an electric motor for driving said object, a pair of saturable core reactors each having a reactance winding and a D.-C. saturation control winding, means in circuit with said reactance windings for rectifying the current flowing in said reactance windings thereby to effect an initial fixed polarity saturation of said reactors, means responsive to positional disagreement of said pilot device and driven object for supplying a direct current to said control windings for selectively increasing the saturation of one of said reactors depending on the sign of said disagreement and decreasing the saturation of the other of said reactors, and means responsive to the difference in saturation of said reactors for energizing said motor for rotation in a direction to drive said object toward positional agreement with said pilot device and for simultaneously interrupting the circuit of the reactance winding of the reactor of which the saturation was decreased.

7. A follow up control system for controlling the driving of an object into positional agreement with a pilot device comprising in combination an electric motor for driving said object, a source of alternating voltage, a pair of saturable core reactors each having a reactance winding supplied from said source, an anti-hunt winding and a D.-C. saturation control winding, means in circuit with each of said reactance windings for rectifying the current in said reactance windings to provide an initial fixed polarity saturation of said reactors, means responsive to positional disagreement of pilot device and driven object for supplying direct current to said control windings to increase the saturation of a first one of said reactors and decrease the saturation of the second of said reactors, and means responsive to the difference in saturation of said reactors for energizing said motor for rotation in a direction to drive said object toward positional agreement with said pilot device comprising a pair of electromagnetic switching devices each having an operating coil in circuit with a different one of said reactance windings, contacts for controlling the supply of current to said motor and additional contacts for controlling the supply of current to the anti-hunt winding of said first reactor.

8. A system for controlling the driving of an object into positional agreement with a pilot device comprising in combination an electric motor for driving said object, a source of alternating voltage, a pair of saturable core reactors each having a reactance winding supplied from said source and a D.-C. saturation control winding, means in circuit with each of said reactance windings thereby to provide an initial saturation of said reactors, means responsive to positional disagreement of said pilot device and driven object for supplying a direct current to said control windings to increase the saturation of one of said reactors depending on the sign of said disagreement and to decrease the saturation of the other of said reactors, and means responsive to the difference in saturation of said reactors comprising an electromagnetic switching means responsive to the difference in saturation of said reactors for effecting energization of said motor for rotation in a direction to drive said object toward positional agreement with said pilot device.

9. A system for controlling the driving of an object into positional agreement with a pilot device comprising in combination an electric motor for driving said object, a source of alternating voltage, a pair of saturable core reactors each having a reactance winding supplied from said source and a D.-C. saturation control winding, means in circuit with each of said reactance windings for rectifying the current in said reactance windings thereby to provide an initial saturation of said reactors, means responsive to positional disagreement of said pilot device and driven object for supplying a direct current to said control windings to increase the saturation of one of said reactors depending on the sign of said disagreement and to decrease the saturation of the other of said reactors, and means responsive to the difference in saturation of said reactors for energizing said motor for rotation in a direction to drive said object toward correspondence with said pilot device comprising a differential relay having a core member provided with an operating coil connected in circuit with one of said reactance windings, a second operating coil connected in circuit with the other of said reactance windings, and contacts in circuit with said motor controlled by said coils.

MARTIN A. EDWARDS.
HUGH M. OGLE.